Sept. 8, 1959           O. C. HOLBROOK ET AL           2,903,065
SECONDARY RECOVERY OF OIL FROM RESERVOIRS
BY SUCCESSIVE PRECIPITATION
Filed Aug. 7, 1957

INVENTORS
ORRIN C. HOLBROOK
BY GEORGE G. BERNARD

*Edward W. Long*

ATTORNEY

United States Patent Office 2,903,065
Patented Sept. 8, 1959

2,903,065

SECONDARY RECOVERY OF OIL FROM RESERVOIRS BY SUCCESSIVE PRECIPITATION

Orrin C. Holbrook and George G. Bernard, Crystal Lake, Ill., assignors to The Pure Oil Company, Chicago, Ill., a corporation of Ohio Application August 7, 1957, Serial No. 676,875

12 Claims. (Cl. 166—9)

This invention relates to the recovery of petroleum oil from subterranean geological formations. It is more specifically concerned with the displacement of oil from reservoirs which have been partially depleted by conventional recovery techniques.

According to this invention, residual petroleum oil is recovered from partially depleted oil-bearing reservoirs by forming, by precipitation, a mass of a solid material within the interstitial passageways of the formation adjacent an input well. The precipitate mass is propagated through the formation toward a producing well, thereby displacing a portion of the residual oil which is flushed from the formation by a water flood into the producing well and recovered.

Because the recovery efficiency of primary recovery methods involved in the production of petroleum oil is substantially less than one hundred percent, it is necessary to supplement the effect of natural energy drives with secondary recovery techniques employing artificial drive-means, such as water- or gas-flooding. It was reported in 1955 that ultimate recovery of recoverable oil from known pools in the United States by natural means and secondary recovery projects is almost 80 billion barrels (Oil and Gas Journal, June 27, 1955). In contrast to this, there are many billion barrels of oil which are left in the ground because a large part of this oil is not physically recoverable by conventional primary and secondary methods.

It is, therefore, a primary object of this invention to provide a method for recovering oil from partially depleted reservoirs, which is not normally recoverable by means of water- or gas-drive secondary recovery methods.

This and other objects will become apparent from the following detailed description of the instant invention.

Figure 1:
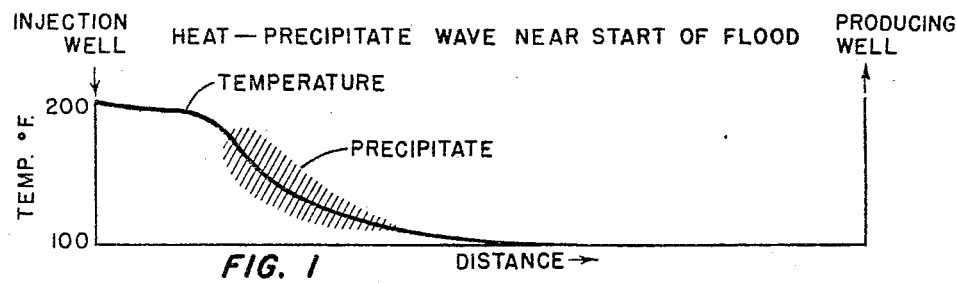
Figures 1 and 2 are graphical presentations illustrating the temperature-precipitate relationship at several stages of a specific embodiment of recovery process of this invention.

It has been found that a portion of petroleum oil unrecoverable from subterranean reservoirs by conventional primary and secondary methods can be produced by forming within the interstitial passageways a solid precipitate under controlled conditions which will displace the occluded oil from the internal surfaces of the reservoir. The released oil can then be produced by flushing it from the reservoir by means of a conventional water-drive.

To illustrate the basic concept of this invention, several experiments were performed which illustrate that if a controlled amount of a precipitate is present in the pores of a formation during a waterflood, increased oil recovery results. The following experimental procedure was used to obtain the data shown in Table I.

The cores used in these experiments were cut from Berea sandstone slabs obtained from the Cleveland Quarries Company. Each core measured about 12" x 1½" x 2" and had a permeability of 100 to 200 millidarcys.

Each core was mounted by covering the ends of the core with masking tape, and coating the sides of the core with an impermeable plastic, e.g., Scotchcast Resin No. 2 marketed by the Minnesota Mining and Manufacturing Company. After the plastic was cured overnight at room temperature, the masking tape was removed from the core ends, and the core was mounted between two plastic (Lucite) end-plates by means of brass tie-rods. The end-plates were provided with means which permitted the passage of fluid through the core. The core was initially saturated with a petroleum oil and a supersaturated salt solution. Thereafter, the core was cooled until the salt precipitated, whereupon the core was flooded in the presence of the precipitate.

This procedure was effected in the following manner: The mounted core was weighed, then evacuated with a vacuum pump. The evacuated core was completely saturated with distilled water and weighed. From the difference between the weights of the empty core and the water-saturated core, the pore volume of the core was calculated. The core was then placed in a constant temperature cabinet maintained at an elevated temperature $T_1$. A salt solution saturated at temperature $T_1$ was passed through the core until all of the distilled water was displaced from the core. A mineral oil (Soltrol C) was passed through the core until "connate" water saturation was reached at temperature $T_1$. The volume of the salt solution forced out of the core by the mineral oil was measured and from this volume the oil saturation in the core was calculated. The core was then cooled, to approximately room temperature, $T_2$. While the core was being cooled its inlet and exit were in contact with the salt solution. This was done to prevent entrance of air into the core while the saturation fluids in the core cooled and contracted. The salt solution on cooling from temperature $T_1$ to $T_2$ deposited salt throughout the core. The weight and volume of the deposited salt were calculated from knowledge of the solubility behavior of the salt and the volume of the salt solution initially present in the core at temperature $T_1$.

Figure 3:
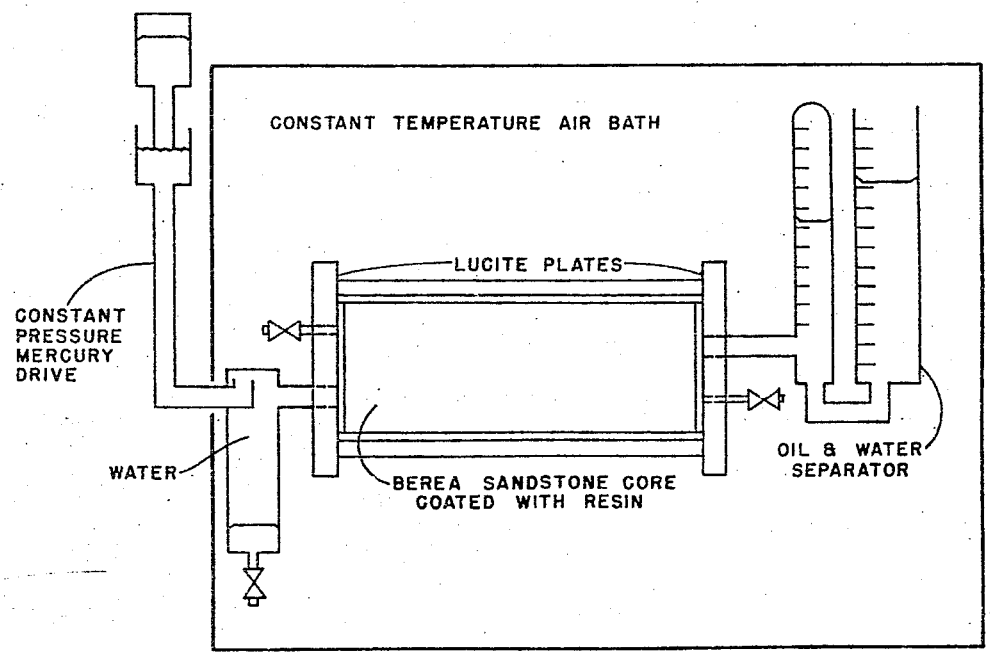
Figure 3 is a schematic diagram of the laboratory apparatus employed in investigating the effectiveness of the process of this invention.

The core was next flooded at a temperature $T_2$ with a salt solution saturated at temperature $T_2$. All water floods were carried out under a pressure differential of 76 cm. of mercury. All floods were continued until the water-to-oil ratio was more than 100. The apparatus for carrying out these experiments is shown in Figure 3. The results of these tests are shown in Table I which clearly indicates that controlled precipitation to effect the partial decrease in volume of the interstitial pore spaces substantially lowers the residual oil saturation after a waterflood.

TABLE I
*Effect of precipitate on oil recovery*

| Exp. No. | Initial saturations | | Flooding procedure | A. Average residual oil saturation with number p.p.t. present [1] | B Percent of pore vol. filled with p.p.t. | C Residual oil saturation percent | Efficiency of p.p.t. in oil displacement (A−C)/B |
|---|---|---|---|---|---|---|---|
| | Percent oil | Percent water | | | | | |
| B-34 | 56.3 | 43.7 | } Core flooded with distilled water | 41.7 | 0 | 38.7 | |
| B-31 | 57.0 | 43.0 | | 41.7 | 0 | 43.0 | |
| B-21 | 41.5 | 58.5 | } Core flooded with NH₄NO₃ satd. at 28° C | 41.7 | 0 | 37.8 | |
| B-22 | 58.6 | 41.4 | | 41.7 | 0 | 50.6 | |
| B-24 | 54.3 | 45.7 | | 41.7 | 0 | 38.6 | |
| B-28 | 44.5 | 55.5 | } 13.5% of pore space filled with NH₄NO₃ p.p.t., core flooded with saturated NH₄NO₃ solution at room temperature. | 41.7 | 13.5 | 34.1 | 0.56 |
| B-29 | 53.5 | 46.1 | | 41.7 | 13.5 | 34.0 | 0.57 |
| B-18 | 42.5 | 57.5 | | 41.7 | 13.5 | 29.2 | 0.92 |
| B-32 | 54.4 | 45.6 | } 5% of pore space filled with NH₄NO₃ p.p.t., core flooded with saturated NH₄NO₃ solution at room temperature. | 41.7 | 5.0 | 36.1 | 1.12 |
| B-33 | 57.5 | 42.5 | | 41.7 | 5.0 | 36.6 | 1.02 |
| B-36 | 67.5 | Hg 32.5 | Core initially contained oil and mercury, flooded with distilled water. | 41.7 | Hg 32.5 | 32.2 | 0.29 |

[1] Average of residual oil saturations of runs B-34, 31, 21, 22, and 24.

In order to employ a technique for effecting the formation of a controlled amount of a precipitate within the interstitial passageways, it would be necessary for maximum effectiveness to flood the partially depleted reservoir with a concentrated solution of a selected salt. With the salt solution in place, the temperature would have to be decreased, thereby changing the solubility of the salt in the solvent, and causing the dissolved solute to crystallize in controlled amounts. Temperature control of the in situ solvent could be accomplished by shutting in the reservoir and allowing the solution temperature to reach equilibrium with the formation temperature. If the normal formation temperature was greater than the temperature required to bring about the controlled precipitation of the solute, the necessary cooling could be provided by passing a cool, heat-transfer medium through an adjacent superposed and/or infraposed, permeable formation. To avoid vertical communication of the heat-transfer medium and the salt solution, it would be preferred that an impermeable barrier exists between the formation being treated and the adjacent formations which serve as the heat-transfer zones. It is apparent, however, that disadvantageous factors, such as temperature control, amount of solution required to flood the reservoir, and others, preclude the application of this modus operandi in the field.

According to this invention, it has been found that a precipitate wave can be propagated which will progressively move through the formation, displacing the residual oil from the partially depleted reservoir as it moves therethrough. In a preferred embodiment, a heat wave and a precipitate wave are simultaneously propagated in a reservoir by the injection of a hot concentrated salt solution at a temperature in excess of formation temperature into the reservoir. Upon the introduction of the solution into the formation, a precipitate will form as the hot injected solution is cooled to the cooler reservoir temperature. As a portion of the reservoir is heated by the injected solution, the precipitate will redissolve in the injected water in the heated portion of the reservoir, and be reprecipitated in the cooler portion of the rock. Thus, the precipitate front and the heat front will advance together.

In carrying out this technique, the waterflooding and controlled precipitation is carried out concomitantly, as will be noted from the following description of a more specific example of this invention. At the outset of the process, the flood water is heated before injection to a temperature appreciably higher than normal formation temperature (for example, with a formation temperature of 100° F., the water is heated to 150° F.) and is saturated with an oil-insoluble material soluble in water at higher temperatures, such as a salt. The temperature of the solution is then raised to a still higher temperature (e.g., 200° F.) and thereafter is injected into the formation. As the injected solution flows through the formation, the formation will be heated nearly to the temperature of the injected solution, as shown in the temperature profiles graphically illustrated in Figures 1 and 2. As additional amounts of heated solution are injected, the heated zone will expand radially from the injected well. As the hot (200° F.) solution, saturated at 150° F., passes from the heated portion of the formation into the formation at normal temperatures (100° F.), a part of the solute in the solution will be precipitated by crystallizing, thereby reducing the pore volume of that part of the formation and "squeezing" the oil out. As more solution is injected, the heated zone will advance, and the solute which had precipitated will redissolve in the hot solution, advance with the water until it reaches the cooler part of the formation, and then precipitate again. The concomitant waterflooding is effected by the aqueous salt solution.

In the illustration given above, the solution is saturated with a salt at 150° F., then heated to 200° F. The reason for injecting the solution at a temperature higher than the temperature at which it is saturated is to compensate for the heat losses from the formation to adjacent formations. If the saturated solution (at 150° F.) were injected at the temperature of 150° F., and the temperature of the solution dropped to 140° F. before the solution reached the heat front, salt would be precipitated before it reached the heat front and would not advance.

The effectiveness of the instant invention was determined by employing a synthetic core prepared by packing a mixture of Ottawa sand and a plastic (Scotchcast) resin into a plastic (Lucite) tube. The tube which was equipped with thermometers and manometers to permit measurement of temperatures and pressures at selected places along the length of the core, was packed with 50–70 mesh Ottawa sand through all of its length except for the first and last 4 cm. sections. These were packed with 20 mesh sand. The total length of the core was 123 cms. The more permeable, large-grained sand was used to reduce plugging effects at the inlet and outlet of the core.

In this procedure, water, oil, precipitate and heat moved through the core during the flooding operation. In carrying out this scheme, the synthetic core was completely saturated with a 28 wt. percent KNO₃ solution. At this concentration the solution was saturated at room temperature. The core was then flooded with a mineral oil (Soltrol C) to a "connate" water saturation at room temperature. The core was insulated with vermiculite and equipped with three controlled heating coils.

To effect the heat-precipitate wave-flood, a supersaturated salt solution initially at an elevated temperature was pumped at a constant rate into the core. In some experiments salt solutions with different degrees of supersaturation were consecutively used in one run. While the supersaturated solution was being injected into the core the following measurements were taken: volumes of oil and water produced, temperatures and pressures existing in various sections of the core.

Even though the core was insulated with vermiculite, it still lost a greater amount of heat than would be lost in the reservoir. Data in the literature shows that after about three pore volumes of hot water have passed through, a reservoir rock attains the initial temperature of the water. To attain this condition the core was heated with three electrical coils, as it was being flooded.

Figure 2:
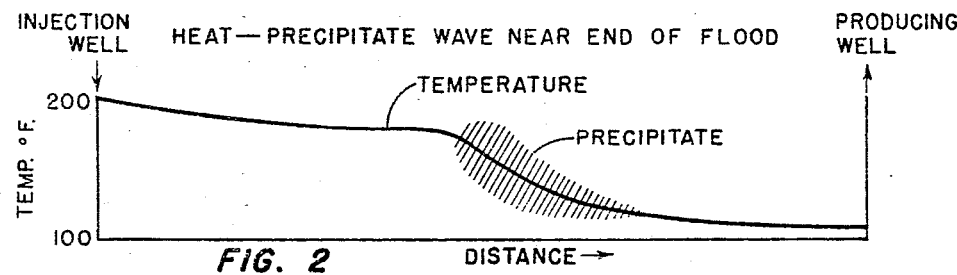

The advance of the heat wave was measured by the thermocouples and the advance of the precipitate wave by the pressure taps. Typical data from these experiments is shown in Figures 1 and 2. These experiments showed that a satisfactory heat-precipitate wave was created and propagated through the synthetic sand column. To determine the effect of the presence of a precipitate on the permeability of a formation, tests were run on cores in which known percentages of the pore volume were filled with precipitate and the permeability to water was determined. It was found from these tests that the presence of a precipitate in a formation in the concentrations employed in the process of this invention would not seriously decrease the permeability.

To illustrate the enhancement in drainage efficiency produced by this invention, synthetically consolidated packed sand columns containing thermocouples and manometers prepared as above were employed in a series of experiments. In these experiments, the columns were saturated with water, driven with oil (Soltrol) to connate water, waterflooded to residual oil, and then subjected to heat-precipitate treatment described above. The results of such experiments are shown in Table II. It is seen in this table that additional oil not recoverable by waterflooding is recovered by the precipitate-wave technique of this invention.

TABLE II

*Oil recovery experiments using heat wave-precipitate process*

| | Experiment No. | | |
|---|---|---|---|
| Oil saturation, percent | 1 | 2 | 3 |
| Initial | 78 | 78 | 77.1 |
| After waterflood at 80° F | 29.3 | 30.1 | 31.9 |
| After heat-p.p.t. wave | 27.3 | 28.3 | 29.4 |
| Precipitant | | | |
| Salt | $K_2Cr_2O_7$ | $K_2Cr_2O_7$ | $K_2Cr_2O_7$ |
| Temp. of injected solution, °F | 150 | 150 | 150 |
| Conc. of injected solution, wt. percent | 36* | 41 | 46 |

*Saturated solution at 80° F. contains 18% $K_2Cr_2O_7$.

The advantages of the instant invention are additionally illustrated by the following complete specific embodiment of this invention in which a siliceous reservoir having an oil saturation of 45% and reservoir temperature of 30° C. is treated. Initially, a 22 wt. percent borax solution is injected into the reservoir at a temperature of 80° C. This is done by heating the solution to a temperature of about 90° C. prior to injection.

Since the formation temperature is 30° C., and the solubility of borax at this temperature is only 3.86 g./100 cc. water, the borax crystallizes as the liquid injection is continued. This deposition of solid borax in the reservoir forces oil out. When the volume of 22% borax solution injected into the reservoir equals 10% of the pore space, the injection of this solution is stopped. Next, a second solution containing 3.7 wt. percent of borax at a temperature of 80° C. is injected for the remaining life of the flood. On entering the hot, precipitate-containing section of the formation, this second solution dissolves the precipitate from areas near the injection wells and carries it in solution outward until it reaches that part of the formation that has not yet been treated. Here the precipitate is deposited. Thus, this process results in a continual transfer of precipitate from the injection well to the producing well.

At the conclusion of the flood, the residual oil saturation is found to be substantially reduced over what would be produced by conventional waterflooding.

The specific solute, such as a salt, to be used in this process will depend on the connate water in the formation. The substance should be relatively insoluble in the connate water at normal formation temperature but appreciably soluble at the higher temperature. The most important property that the salts to be used in this process must have is increasing solubility with rise in temperature. This is basic to the formation and dissolution of the precipitate. Salts having the largest change in solubility with temperature will form the most dense precipitate waves. This is an important factor in formations where permeability is low, and the possibility of plugging exists.

Examples of suitable salts include but are not limited to $KNO_3$, $K_2Cr_2O_7$, $KBrO_3$, $Na_3PO_4$, thiourea, $H_3BO_3$.

In selecting the proper salt solution for producing the desired precipitate, one important criterion which can be used is formation, or so-called "bottom-hole," temperature. The solution which is selected will be heated to about 50°–100° F. higher than the formation temperature. The salt or solute selected will be one having solubility characteristics such that, when present in amounts sufficient to provide a saturated solution, will recrystallize at formation temperature to form, in the solid state, at least 50% of the amount of solute used to prepare the solution. The amount of solute which recrystallizes at formation temperature should be sufficient to decrease the pore volume occupied by the heated solution by about 5–20%. For example, if the normal formation temperature is not in excess of about 75° F. aluminum potassium sulfate could be used; 75°–100° F., barium hydroxide could be used; or 100°–125° F., sodium tetraborate could be used.

The selection of a proper salt can be readily made by those skilled in the art by reference to chemical handbooks, the International Critical Tables or other standard works covering the solubility of various salts. Core studies are also helpful in selecting the proper salt by carrying out investigations of temperature-precipitate relationships in core samples of the formation to be treated.

The selected salt solution on entering the formation is cooled to formation temperature and salt is precipitated. The amount of solution introduced will depend upon a number of factors including concentration, reduction in pore volume desired, and others. The optimum amount should be determined by a preliminary evaluation using core samples. In general, a volume of solution equivalent to about 10–25% of the formation pore volume should be used, although amounts outside this range can be used depending upon lithographic and stratographic conditions which exist in the formation to be treated. With the introduction of the heated solution, the formation near the well bore will heat up to the temperature of the incoming liquid. Under these conditions no more precipitate is formed in the heated section of the formation because the incoming liquid would not be cooled there. Instead, the incoming liquid would pass through the heated section unchanged and deposit its precipitate on reaching the adjacent, unheated section of the formation. As injection of the hot concentrated solution continued, a bank of precipitate is formed extending radially from the well bore. By controlling the inlet temperature and the nature and concentration of the precipitants involved, any desired percentage of the pore volume of the formation can be filled with precipitate. Additional oil is recovered from the part of the formation filled with precipitate.

After about 5-15% of the formation had been heated and partially filled with precipitate, the concentration of precipitant in the injected water is reduced to that concentration required to saturate the injection water at the normal formation temperature. The temperature of the second solution preferably is the same as the temperature of maximum efficiency. Other temperatures in excess of formation temperature can be used with a resulting sacrifice in efficiency. The injection of hot water containing a lower salt concentration continues. On entering the hot, precipitate-containing formation, the second solution dissolves the precipitate from near the injection well and carries it in solution outward until it reaches that part of the formation which had not yet been heated. Here the solute is crystallized and redeposited. In this manner there is produced a continual transfer of precipitate from near the well bore out to the unheated portion of the reservoir. Accordingly, the precipitate wave is propagated through the entire formation with the leading edge of the heat wave and of the precipitate wave substantially coinciding. The introduction of the second solution is continued until there is a "breakthrough" of this solution into the producing well.

It is preferred that the second solution which in essence functions as a precipitate-transfer fluid, be an aqueous medium in which the solute employed in the first solution is soluble under the treating conditions. Accordingly, the selected solution will in general consist of a solution which contains a concentration of the same solute employed in the first solution sufficient to provide a saturated solution at the normal temperature of the formation being treated thereby permitting redissolution of the precipitate formed by crystallization of the solute in the first solution. Other solutions, however, can be used, such as naturally-occurring brine solution having the desired solubility characteristics or the like. Although non-aqueous precipitate transfer means can also be used, the economics of the system would normally preclude the use of such expedients.

Although the above-described technique is preferably employed in the oil recovery process of this invention, other expedients can be utilized to effect the controlled precipitation feature. For example, a two-step injection method wherein a quantity of water, containing chelated metal atoms, is first injected into the formation, and the metal is subsequently freed from the complex and precipitated by injecting floodwater which has been treated to overcome the effect of the chelate compound (chelate compounds are compounds which will inactivate a metallic ion with the formation of an inner rig structure in the molecule, the metallic ion becoming a member of the rings). In employing this technique, calcium carbonate can be added to water and chelated by the addition of a stoichiometric amount of a chelating agent, such as the tetrasodium salt of ethylene-diamine tetra-acetic acid. Materials of this type, which may broadly be classified as polyamino polycarboxylic acids, and their salts, are available under the tradename "Versenes" and are fully described in "Key to Chelation—the Versenes," Technical Bulletin No. 2 of the Bersworth Chemical Company, Framingham, Mass. Since Versene Regular (which is the tetra-sodium salt of ethylenediamine tetraacetic acid) has maximum chelating ability at pH 7 or greater, the solution acidity should be adjusted in any suitable manner. This chelate solution is then injected into the formation in an amount which will provide the desired volume of precipitate in the following step.

Following injection of the chelate solution, waterflooding is initiated, using water acidified to a low pH (less than pH 5), and when the advancing flood front commingles with the chelate solution, the pH of the solution is lowered and the metallic ions are freed. They then may combine with cations from the original metallic compound, from the acidified water, or from the formation to form insoluble precipitates within the formation. For example, if flood water acidified with sulfuric acid is used in conjunction with the chelate solution described above, the freed calcium ions form calcium sulfate which is insoluble in the dilute acid solution and precipitates within the formation.

Any compound containing a metal with a valence of two or more can be used, the choice in general depending on cost, availability, and insolubility. The acid must be one which will not form soluble salts upon reaction with the metal chosen. The chelate compound is chosen such that its effectiveness varies abruptly over a narrow range of a suitable variable, such as pH in the given example.

Precipitate-wave propagation, wherein the precipitate is successively redissolved and reprecipitated as the wave travels through the rock reservoir, can also be carried out by injecting a solution which yields a precipitate when neutralized by the rock, followed by a dilute acid solution to redissolve the precipitate. In this method the following procedure can be used: (1) Inject a solution of, for example, ferric chloride (1–10% by weight). The volume of ferric chloride solution should be about 0.001 to 0.01 of the pore volume of the reservoir to be flooded. Generally, reservoir rocks, and even sandstones, contain enough carbonate and oxide to neutralize an acidic solution of this kind, resulting in the precipitation of gelatinous ferric hydroxide.

(2) The ferric chloride solution is followed by the normal floodwater, containing sufficient dilute acid (carbonic acid, hydrochloric acid, etc.) to just dissolve the precipitated ferric hydroxide. As the solution containing the redissolved ferric hydroxide passes on through the next part of the reservoir rock, the solution is neutralized by reaction with the rock and the ferric hydroxide is reprecipitated. Thus, the same ferric hydroxide is redissolved and reprecipitated more or less continuously in a front which is propagated through the reservoir as injection of floodwater continues. The result is that each part of the reservoir rock becomes subjected to the advantageous effects of precipitate formation, causing an increased recovery of oil from the reservoir as a whole.

Various other salts can be used that yield precipitates by reaction with the rock, provided the resulting precipitates are soluble in dilute acid. A preferred dilute acid is carbonic acid obtained by the solution of combustion gases in water.

The acidity of the injected precipitating salt solution, as well as the acidity of the water injected behind the salt solution is controlled to correspond to the amount of acid-soluble matter in the reservoir rock. The larger the amount of acid-soluble matter in the rock, the more acidic (total acidity) the injected salt solution and chaser solution need to be.

It is evident from the foregoing discussion that the formation of a precipitate, which is successively redissolved and reprecipitated to propagate a precipitate wave that longitudinally traverses a partially depleted, oil-bearing rock reservoir in combination with an accompanying water-flood, enhances the efficiency of the water drive. Other modifications and variations of the process of this invention will be apparent to those skilled in the art in view of the above-described illustrative techniques. Although the specific illustrative embodiments were directed to the treatment of sandstone formations, the instant invention can be carried out in limestone formations as well. Strata which are substantially homogeneous in permeability respond to this process more efficiently than vuggy formations containing irregularities, fissures, and the like. It is intended, of course, that these and other obvious extensions of this invention be included except those expressly excluded by the claimed definition of this invention.

What is claimed is:

1. An oil recovery process for producing residual oil from a partially depleted petroleum oil-bearing, geological stratum traversed by an injection well and a producing well which comprises introducing into said stratum a first solution heated at an elevated temperature about 50–100° F. above normal stratum temperature, said solution containing oil-insoluble salt solute which is substantially insoluble in said solution at normal formation temperature, the amount of said solution introduced being sufficient upon cooling by contact with the stratum at normal stratum temperature to precipitate said salt in an amount to uniformly reduce the pore volume of said zone within the range of 5% to 20% whereby there is displaced a portion of said residual oil from within said zone without substantially increasing the resistance of said stratum to the flow of fluids therethrough, thereafter introducing into said stratum a more dilute solution of the same salt heated to an elevated temperature substantially above normal stratum temperature in which solution said salt is substantially insoluble at normal stratum temperature, said more dilute solution being characterized by the ability to redissolve the precipitate formed by said salt and to again precipitate it at formation temperature, continuing the introduction of said more dilute solution until increased production of oil through said producing well is effected.

2. A process in accordance with claim 1 in which the temperature of said more dilute solution is substantially the same as the temperature of said first solution.

3. An oil recovery process for producing residual oil from a partially depleted petroleum oil-bearing, geological stratum traversed by an injection well and a producing well which comprises introducing into said stratum a first solution heated to an elevated temperature about 50–100° F. above normal stratum temperature, said solution containing oil-insoluble salt solute in an amount such that not less than about 50% by weight of said salt solute is precipitated from said solution at normal stratum temperature, the amount of solution injected being sufficient to form adjacent said injection well by contact with the stratum at normal stratum temperature a quantity of a precipitate of said salt sufficient to uniformly reduce the pore volume of said zone with the range of about 5% to 20% whereby there is displaced a portion of said residual oil from within said zone without substantially increasing the resistance of said stratum to the flow of fluids therethrough, thereafter introducing into said stratum a different solution heated to an elevated temperature substantially above normal stratum temperature, said different heated solution being characterized by the ability to redissolve the precipitate formed by said salt and to reprecipitate it at formation temperature, continuing the introduction of said different solution until increased production of oil through said producing well is effected.

4. A process in accordance with claim 3 in which each of said solutions contains the same solute, the concentration of the solute being greater in said first solution.

5. A process in accordance with claim 4 in which the normal stratum temperature is not greater than about 75° F. and said salt solute is aluminum potassium sulfate.

6. A process in accordance with claim 4 in which the normal stratum temperature is within the range of about 75°–100° F. and said salt solute is barium hydroxide.

7. A process in accordance with claim 4 in which the normal stratum temperature is within the range of about 100–125° F. and said salt solute is sodium tetraborate.

8. A process for recovering oil from a partially depleted oil-bearing reservoir traversed by an injection well and a producing well comprising injecting into said formation a first aqueous solution containing in solution a solute completely soluble in the solution under conditions prior to injection but which is at least partially insoluble under formation conditions and is substantially insoluble in the reservoir oil, injecting said solution into the formation in an amount to precipitate an amount of solute equal to a fraction of the pore volume of said reservoir, thereafter injecting into said formation a different aqueous solution capable of redissolving said precipitate, forcing said solution containing said redissolved precipitate through said formation toward said producing well and repeating said precipitation and re-solution process until there is affected increased production of oil at said producing well.

9. A process in accordance with claim 8 in which said first aqueous solution is heated to a temperature in excess of formation temperature prior to injection into said formation, the solute is a salt which is present in an amount in excess of that amount which is soluble at formation temperature, and said different aqueous solution is a solution containing less of said salt than said first solution, controlling the amount and concentration of said different solution so that the resultant solution after re-solution of said precipitate will again partially precipitate upon cooling to formation temperature.

10. Method in accordance with claim 8 in which said solutions are heated to a temperature of about 50–100° F. above formation temperature.

11. Method in accordance with claim 8 in which the solute is ferric chloride and said different solution is a dilute acid solution.

12. Method in accordance with claim 3 in which the first solution is injected in an amount equivalent to about 10–25% of the formation pore volume.

References Cited in the file of this patent

UNITED STATES PATENTS

| | | |
|---|---|---|
| 2,238,930 | Chamberlain et al. | Apr. 22, 1941 |
| 2,779,415 | Howard | Jan. 29, 1957 |